US012738665B2

(12) United States Patent
Hashimoto

(10) Patent No.: US 12,738,665 B2
(45) Date of Patent: Sep. 15, 2026

(54) RADIO WAVE ABSORBER AND RADIO WAVE ABSORBING COMPOSITION

(71) Applicant: FUJIFILM Corporation, Tokyo (JP)

(72) Inventor: Hirokazu Hashimoto, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 326 days.

(21) Appl. No.: 17/697,268

(22) Filed: Mar. 17, 2022

(65) Prior Publication Data

US 2022/0376402 A1 Nov. 24, 2022

Related U.S. Application Data

(63) Continuation of application No. PCT/JP2020/033846, filed on Sep. 8, 2020.

(30) Foreign Application Priority Data

Sep. 30, 2019 (JP) ................................ 2019-179835
Feb. 27, 2020 (JP) ................................ 2020-031936

(51) Int. Cl.
*H01Q 17/00* (2006.01)
*G01N 23/207* (2018.01)
*H01F 1/34* (2006.01)

(52) U.S. Cl.
CPC ......... *H01Q 17/004* (2013.01); *G01N 23/207* (2013.01); *H01F 1/348* (2013.01); *G01N 2223/056* (2013.01)

(58) Field of Classification Search
CPC ............... H01Q 17/004; G01N 23/207; G01N 2223/056; H01F 1/348
USPC .............................................................. 342/1
See application file for complete search history.

(56) References Cited

U.S. PATENT DOCUMENTS 6,419,847 B1 7/2002 Toyota et al.
10,249,417 B2 4/2019 Morita
10,622,127 B2 4/2020 Sakane et al.
10,919,778 B2 2/2021 Sakane et al.
12,112,871 B2 10/2024 Hashimoto
12,125,622 B2 10/2024 Hashimoto
2003/0044623 A1 3/2003 Sakurai et al.
2003/0044633 A1 3/2003 Nagaraj et al.
2003/0079893 A1 5/2003 Hashimoto et al.
2004/0036645 A1 2/2004 Fujieda et al.
2004/0227663 A1 11/2004 Suzuki et al.
2005/0282043 A1 12/2005 Yamazaki et al.
2007/0131894 A1 6/2007 Takada et al.
2007/0241962 A1 10/2007 Shinoda et al.
2009/0266604 A1 10/2009 Tokiwa
2009/0297432 A1* 12/2009 Hill .................... C04B 35/6262 423/594.2
2010/0060539 A1 3/2010 Suetsuna et al.
2010/0238063 A1 9/2010 Ohkoshi et al.
2012/0100064 A1 4/2012 Ohkoshi et al.
2012/0105185 A1 5/2012 Oda et al.
2013/0140076 A1 6/2013 Lee et al.
2014/0091501 A1 4/2014 Hattori et al.
2015/0187380 A1 7/2015 Shirata
2017/0275438 A1 9/2017 Kobayashi et al.
2018/0009677 A1* 1/2018 Aga ........................ H01F 1/348
2018/0370197 A1 12/2018 Nagamune et al.
2019/0051436 A1 2/2019 Imaoka et al.
2019/0215994 A1* 7/2019 Hiroi ...................... B32B 15/08
2019/0312356 A1 10/2019 Fujita et al.
2019/0380232 A1 12/2019 Machinaga et al.
2020/0008328 A1 1/2020 Hiroi et al.
2020/0227833 A1 7/2020 Hiroi et al.
2020/0335247 A1 10/2020 Hosoya et al.
2021/0151895 A1 5/2021 Ohkoshi et al.
2021/0166849 A1 6/2021 Hashimoto
2021/0179442 A1 6/2021 Chen et al.
2021/0194147 A1 6/2021 Nagano
2022/0039301 A1 2/2022 Hashimoto
2022/0059945 A1 2/2022 Hashimoto
2022/0059946 A1 2/2022 Hashimoto
2022/0061198 A1 2/2022 Shirata et al.
2022/0167535 A1 5/2022 Nakai et al.

FOREIGN PATENT DOCUMENTS

CN 102473514 A 5/2012
CN 102473519 A 5/2012
CN 107032776 A 8/2017
CN 107227023 A 10/2017
CN 107406272 A 11/2017
CN 109265155 A 1/2019
DE 37 29 693 A1 5/1988
(Continued)

OTHER PUBLICATIONS

Cullity et al. "Introduction to Magnetic Materials," 2nd Edition 2009 by the Institute of Electrical and Electronics Engineers, John Wiley & Sons, Inc (Year: 2009).*
Rahmawati et al, "Optimization of Frequency and Stirring Rate for Synthesis of Magnetite (Fe3O4) Nanoparticles by Using Coprecipitation—Ultrasonic Irradiation Methods," Science Direct, Procedia Engineering 170, Elsevier Ltd ( 2017 ) 55-59 (Year: 2017).*
Sharif et al. "Enhanced Magnetization in Highly Crystalline and Atomically Mixed bcc Fe—Co Nanoalloys Prepared by Hydrogen Reduction of Oxide Composites," Nanoscale, 2013, 5, 1489-1493 (Year: 2012).*
Poudel. "Effect of Co-doping in Sr1-x/12Mx/12Fe12—xAlxO19 (M=Ca2+, Ba2+, La3+) Hexaferite: Structural, Magnetic, and Mössbauer Study," Thesis, University of Memphis Digital Commons, ;Jul. 30, 2019 (Year: 2019).*
(Continued)

*Primary Examiner* — Samarina Makhdoom
(74) *Attorney, Agent, or Firm* — Sughrue Mion, PLLC

(57) ABSTRACT

A radio wave absorber including a magnetic powder and a binder, in which the magnetic powder is a powder of a hexagonal ferrite in which a ratio ($\sigma s/\beta$) of a saturation magnetization as to a half-width $\beta$ of a diffraction peak on a (107) plane is 240 emu·g$^{-1}$·degree$^{-1}$ or more, where the half-width $\beta$ is determined by X-ray diffraction analysis.

13 Claims, No Drawings

(56) References Cited

FOREIGN PATENT DOCUMENTS

| | | | | |
|---|---|---|---|---|
| EP | 2 708 513 A1 | | 3/2014 | |
| EP | 3 435 386 A1 | | 1/2019 | |
| EP | 3537860 A1 | * | 9/2019 | B32B 25/02 |
| EP | 3 573 439 A1 | | 11/2019 | |
| EP | 3 643 752 A1 | | 4/2020 | |
| EP | 3 943 451 A1 | | 1/2022 | |
| JP | 57-180206 A | | 11/1982 | |
| JP | 63-155700 A | | 6/1988 | |
| JP | 64-000707 A | | 1/1989 | |
| JP | 5-206676 A | | 8/1993 | |
| JP | 7-030279 A | | 1/1995 | |
| JP | 8-340191 A | | 12/1996 | |
| JP | 9-115708 A | | 5/1997 | |
| JP | 11-354972 A | | 12/1999 | |
| JP | 2000-228599 A | | 8/2000 | |
| JP | 2000-232294 A | | 8/2000 | |
| JP | 2001-156487 A | | 6/2001 | |
| JP | 2002-118008 A | | 4/2002 | |
| JP | 2002-185180 A | | 6/2002 | |
| JP | 2002-217586 A | | 8/2002 | |
| JP | 2003-282319 A | | 10/2003 | |
| JP | 2003-332784 A | | 11/2003 | |
| JP | 2004-96084 A | | 3/2004 | |
| JP | 2004-296541 A | | 10/2004 | |
| JP | 2005-033156 A | | 2/2005 | |
| JP | 2005-231931 A | | 9/2005 | |
| JP | 2007-129179 A | | 5/2007 | |
| JP | 2007-250823 A | | 9/2007 | |
| JP | 2008-021990 A | | 1/2008 | |
| JP | 2008-63199 A | | 3/2008 | |
| JP | 2008-169378 A | | 7/2008 | |
| JP | 4173424 B2 | | 10/2008 | |
| JP | 2008-300801 A | | 12/2008 | |
| JP | 2010077198 A | * | 4/2010 | C08J 5/18 |
| JP | 2010-114407 A | | 5/2010 | |
| JP | 2010-184840 A | | 8/2010 | |
| JP | 2010260766 A | * | 11/2010 | |
| JP | 2010-283301 A | | 12/2010 | |
| JP | 4674380 B2 | | 4/2011 | |
| JP | 2011-093762 A | | 5/2011 | |
| JP | 2011-178654 A | | 9/2011 | |
| JP | 2012-009797 A | | 1/2012 | |
| JP | 5161813 B2 | | 3/2013 | |
| JP | 2013-526775 A | | 6/2013 | |
| JP | 2013-239637 A | | 11/2013 | |
| JP | 5481538 B2 | * | 4/2014 | H01F 1/33 |
| JP | 2015-127985 A | | 7/2015 | |
| JP | 2016-204499 A | | 12/2016 | |
| JP | 2018-056492 A | | 4/2018 | |
| JP | 2018-110167 A | | 7/2018 | |
| JP | 2018-147999 A | | 9/2018 | |
| JP | 2018-154541 A | | 10/2018 | |
| JP | 2019-012799 A | | 1/2019 | |
| JP | 6521415 B2 | | 5/2019 | |
| JP | 2019-104954 A | | 6/2019 | |
| KR | 10-0675514 B1 | | 1/2007 | |
| WO | 2016/117648 A1 | | 7/2016 | |
| WO | 2018/084234 A1 | | 5/2018 | |
| WO | 2018/168859 A1 | | 9/2018 | |
| WO | 2018/235952 A1 | | 12/2018 | |
| WO | 2019/004104 A1 | | 1/2019 | |
| WO | 2019/017471 A1 | | 1/2019 | |
| WO | 2019/131675 A1 | | 7/2019 | |

OTHER PUBLICATIONS

Iljima et al. "Millimeter Wave Absorber Using M-type Hexagonal Ferrite," 0-7803-5677-2/00/$10.00 © 2000 IEEE (Year: 2000).*

Luo et al. "Physical and magnetic properties of highly aluminum doped strontium ferrite nanoparticles prepared by auto-combustion route," Journal of Magnetism and Magnetic Materials 324 (2012) 2602-2608 (Year: 2012).*

Korean Office Action dated Apr. 7, 2023 in Korean Application No. 10-2022-7009991.

European Office Action dated Apr. 14, 2023 in European Application No. 20871943.5.

Korean Office Action issued Sep. 25, 2023 in Application No. 10-2022-7004173.

Office Action issued Aug. 22, 2023 in European Application No. 20806852.8.

Extended European Search Report dated Oct. 24, 2022 in European Application No. 20871943.5.

Office Action issued Nov. 30, 2023 in U.S. Appl. No. 17/518,825.

Office Action issued Oct. 28, 2023 in Chinese Application No. 202080035150.X.

Korean Office Action dated Oct. 31, 2023 in Korean Application No. 10-2022-7009991.

Office Action dated Dec. 14, 2023 in European Application No. 20 806 133.3.

Office Action issued Jan. 12, 2024 in U.S. Appl. No. 17/518,889.

Communication dated Dec. 15, 2023, issued in Chinese Application No. 202080033792.6.

Office Action issued Sep. 26, 2023 in Japanese Application No. 2021-519287.

Chinese Office Action dated Mar. 6, 2024 in Application No. 202080035479.6.

Communication dated Apr. 2, 2024, issued in Chinese Application No. 202080056518.0.

Office Action issued Dec. 21, 2023 in U.S. Appl. No. 17/173,437.

Clarivate Analytics machine translation of JP 5161813 B2 to Hitomi et al. published Mar. 13, 2013 (Year: 2013), 20 pages total.

Vinnik et al. "Growth of lead and aluminum substituted barium hexaferrite single crystals from lead oxide flux", Materials Science Forum, vol. 843, pp. 3-9. Published online Dec. 28, 2015 (Year: 2015), 7 pages total.

Shono et al. "Magneto-optical properties of magnetoplumbites BaFe12O19, SrFe12—xAlxO19 and PbFe12O19", Japanese Journal of Applied Physics, vol. 21, No. 10, pp. 1451-1454. Oct. 1982 (Year: 1982), 5 pages total.

Naoufal et al. "Synthesis, structure and catalytic properties of Fe-substituted barium hexaaluminates", Catalyst Letters, 54, 1998, 141-148. Sep. 1998 (Year: 1998), 8 pages total.

Luo et al. "Physical and magnetic properties of highly aluminum doped strontium ferrite nanoparticles prepared by auto-combustion route", Journal of Magnetism and Magnetic Materials, 324, 2012, 2602-2608. published online Mar. 15, 2012 (Year: 2012), 7 pages total.

Notice of Allowance issued Apr. 22, 2024 in U.S. Appl. No. 17/518,889.

International Search Report dated Dec. 8, 2020 in International Application No. PCT/JP2020/033846.

Written Opinion of the International Searching Authority dated Dec. 8, 2020 in International Application No. PCT/JP2020/033846.

International Preliminary Report on Patentability dated Apr. 5, 2022 in International Application No. PCT/JP2020/033846.

Office Action issued May 25, 2023 in U.S. Appl. No. 17/518,825.

K. Sadhana et al., "Structural and magnetic properties of nanocrystalline $BaFe_{12}O_{19}$ synthesized by microwave-hydrothermal method", Appl Nanosci, 2012, vol. 2, pp. 247-252 (6 pages).

Office Action issued Nov. 28, 2022 in Korean Application No. 10-2021-7035736.

Office Action issued Oct. 25, 2022 in Japanese Application No. 2021-519388.

International Search Report issued Jun. 30, 2020 in International Application No. PCT/JP2020/011872.

Written Opinion of the International Searching Authority issued Jun. 30, 2020 in International Application No. PCT/JP2020/011872.

International Preliminary Report on Patentability issued Nov. 16, 2021 in International Application No. PCT/JP2020/011872.

Extended European Search Report issued Jul. 1, 2022 in European Application No. 20806852.8.

Notice of Reasons for Refusal dated Oct. 25, 2022 from the Japanese Patent Office in Japanese Application No. 2021-519287.

Japanese Office Action dated Apr. 18, 2023 in Japanese Application No. 2021-519287.

(56) References Cited

OTHER PUBLICATIONS

International Search Report dated Aug. 25, 2020 in International Application No. PCT/JP2020/018621.
Written Opinion of the International Searching Authority dated Aug. 25, 2020 in International Application No. PCT/JP2020/018621.
Extended European Search Report dated May 30, 2022 in European Application No. 20805058.3.
Notice of Reasons for Refusal dated Jun. 21, 2022 from the Japanese Patent Office in Japanese Application No. 2021-519405.
Korean Office Action dated Dec. 19, 2022 in Korean Application No. 10-2021-7036224.
Office Action issued Jun. 29, 2023 in Korean Application No. 10-2021-7036224.
Written Opinion of the International Searching Authority issued Aug. 25, 2020 in International Application No. PCT/JP2020/018622.
International Preliminary Report on Patentability issued Nov. 16, 2021 in International Application No. PCT/JP2020/018622.
Extended European Search Report dated May 30, 2022 in EP Application No. 20806265.3.
Office Action dated Jun. 21, 2022 issued from the Japanese Patent Office in JP Application No. 2021-519406.
Korean Office Action dated Dec. 19, 2022 in Korean Application No. 10-2021-7036117.
International Search Report dated Oct. 20, 2020 issued by the International Searching Authority in Application No. PCT/JP2020/029622.
Written Opinion dated Oct. 20, 2020 issued by the International Searching Authority in Application No. PCT/JP2020/029622.
International Preliminary Report on Patentability dated Feb. 8, 2022 with a Translation of the Written Opinion of the International Searching Authority in Application No. PCT/JP2020/029622.
Extended European Search Report dated Sep. 30, 2022 in EP Application No. 20852946.1.
Office Action dated Feb. 14, 2023 from the Japanese Patent Office in JP Application No. 2021-539210.
Office Action dated Mar. 21, 2023 from the Korean Intellectual Property Office in KR Application No. 10-2022-7004173.
International Search Report dated Aug. 13, 2019 from the International Searching Authority in International Application No. PCT/JP2019/022347.
Written Opinion dated Aug. 13, 2019 from the International Bureau in International Application No. PCT/JP2019/022347.
International Preliminary Report on Patentability dated Mar. 2, 2021 from the International Bureau in International Application No. PCT/JP2019/022347.
Extended European Search Report issued Oct. 1, 2021 in European Application No. 19854513.9.
Notification of Reason for Refusal dated Jan. 14, 2022 from the Korean intellectual Property Office in KR Application No. 10-2021-7004268.
Office Action issued Aug. 3, 2023 in Chinese Application No. 202080035152.9.
Office Action dated Jul. 25, 2023 in Japanese Application No. 2021-539210.
International Search Report issued Aug. 18, 2020 in International Application No. PCT/JP2020/018479.
Written Opinion of the International Searching Authority issued Aug. 18, 2020 in International Application No. PCT/JP2020/018479.
International Preliminary Report on Patentability issued Nov. 16, 2021 in International Application No. PCT/JP2020/018479.
Office Action issued May 6, 2024 in U.S. Appl. No. 17/517,910.
Notice of Allowance issued Jul. 3, 2024 in U.S. Appl. No. 17/518,825.
S. Kolev, et al., "Thermal Treatment Influence on the Magnetic Properties and Degree of Orientation of $BaFe_{12}O_{19}$ Films", J Supercond Nov Magn, 2012, vol. 25, pp. 2819-2824 (6 pages total).
Office Action issued Jun. 25, 2024 in U.S. Appl. No. 17/503,509.
Office Action issued Jul. 3, 2024 in U.S. Appl. No. 17/173,437.
Office Action issued May 8, 2024 in European Application No. 20 806 852.8.
Office Action issued Jul. 23, 2024 in European Application No. 20 805 058.3.
Chinese Office Action dated Jul. 20, 2024 in Application No. 202080033792.6.
Notice of Allowance issued Nov. 22, 2024 in U.S. Appl. No. 17/503,509.
Notice of Allowance dated Nov. 14, 2024 in U.S. Appl. No. 17/173,437.
Japanese Office Action dated Oct. 1, 2024 in Application No. 2023-111034; corresponds to U.S. Appl. No. 17/518,889.
Notice of Allowance issued Oct. 9, 2024 in U.S. Appl. No. 17/517,910.
Communication issued Feb. 11, 2025 in U.S. Appl. No. 17/666,894.
Notice of Allowance issued Jun. 10, 2025, in U.S. Appl. No. 17/666,894.

* cited by examiner

RADIO WAVE ABSORBER AND RADIO WAVE ABSORBING COMPOSITION

CROSS-REFERENCE TO RELATED APPLICATIONS

This application is a Continuation of PCT International Application No. PCT/JP2020/033846 filed on Sep. 8, 2020, which claims priority under 35 U.S.C § 119(a) to Japanese Patent Application No. 2019-179835 filed on Sep. 30, 2019, and Japanese Patent Application No. 2020-031936 filed on Feb. 27, 2020. Each of the above application(s) is hereby expressly incorporated by reference, in its entirety, into the present application.

BACKGROUND OF THE INVENTION

1. Field of the Invention

The present invention relates to a radio wave absorber and a radio wave absorbing composition.

2. Description of the Related Art

A radio wave absorber containing a magnetic powder as the radio wave absorbing material is known. In addition, examples of the radio wave absorber containing a magnetic powder include a radio wave absorber in which a magnetic powder is mixed with a binder (see JP4674380B).

SUMMARY OF THE INVENTION

In recent years, as an electronic device that uses radio waves, a radar for recognizing an object by transmitting and receiving radio waves has attracted attention. For example, an on-vehicle radar transmits radio waves and receives the radio waves reflected by an object (such as a pedestrian, a vehicle, or the like), whereby it can recognize the presence of the object, the distance to the object, or the like. In order to prevent collision with an object, as necessary, an automatic driving control system of an automobile can automatically brake and stop the automobile or can automatically control the speed to keep the distance to the object based on the results obtained by the radar being recognizing the object.

In order to improve the reliability of the system that carries out various controls based on the results obtained by the radar being recognizing the object as described above, it is desired to improve the performance of the radar. For this reason, in recent years, it has begun to be examined to install a radio wave absorber on the front side (an incident side of the radio wave incident from the outside) of the radio wave transmitting and receiving unit of the radar to improve the recognition accuracy.

In consideration of the above, one aspect of the present invention is to provide a radio wave absorber that can contribute to improving the recognition accuracy of the radar.

One aspect of the present invention relates to;

a radio wave absorber comprising a magnetic powder and a binder, in which the magnetic powder is a powder of a hexagonal ferrite in which a ratio (σs/β) of a saturation magnetization as to a half-width β of a diffraction peak on a (107) plane is 240 $emu \cdot g^{-1} \cdot degree^{-1}$ or more, where the half-width β is determined by X-ray diffraction analysis.

In addition, one aspect of the present invention relates to;

a radio wave absorbing composition comprising a magnetic powder and a binder, in which the magnetic powder is a powder of a hexagonal ferrite in which a ratio (σs/β) of a saturation magnetization as to a half-width β of a diffraction peak on a (107) plane is 240 $emu \cdot g^{-1} \cdot degree^{-1}$ or more, where the half-width β is determined by X-ray diffraction analysis.

In one form, the radio wave absorber can be a molded product formed by molding the radio wave absorbing composition.

In one form, the hexagonal ferrite can be a substitution-type hexagonal ferrite.

In one form, the substitution-type hexagonal ferrite can have a composition represented by Formula 1.

$$A^1Fe_{(12-x)}Al_xO_{19} \quad \text{Formula 1}$$

In Formula 1, $A^1$ represents one or more kinds of atoms selected from the group consisting of Sr, Ba, Ca, and Pb, and x satisfies $1.50 \le x \le 8.00$.

In one form, the ratio (σs/β) can be 240 $emu \cdot g^{-1} \cdot degree^{-1}$ or more and 310 $emu \cdot g^{-1} \cdot degree^{-1}$ or less.

In one form, the ratio (σs/β) can be 245 $emu \cdot g^{-1} \cdot degree^{-1}$ or more and 310 $emu \cdot g^{-1} \cdot degree^{-1}$ or less.

In one form, the hexagonal ferrite can be a substitution-type hexagonal ferrite having a composition represented by General Formula 2.

$$A^2Fe_{(12-y)}Al_yO_{19} \quad \text{Formula 2}$$

In Formula 2, $A^2$ represents one or more kinds of atoms selected from the group consisting of Sr, Ba, Ca, and Pb, and y satisfies $0.5 \le y < 1.5$.

In one form, in Formula 2, y can satisfy $0.8 \le y \le 1.2$.

In one form, the ratio (σs/β) can be 300 $emu \cdot g^{-1} \cdot degree^{-1}$ or more and 400 $emu \cdot g^{-1} \cdot degree^{-1}$ or less.

In one form, the radio wave absorber can be used in a radio wave absorbing article for a band of 50 to 90 GHz.

In one form, the substitution-type hexagonal ferrite can be a substitution-type hexagonal strontium ferrite.

In one form, the β can be 0.190 degrees or less.

In one form, in the radio wave absorber and/or the radio wave absorbing composition, the volume filling rate of the magnetic powder can be 35% by volume or less.

According to one aspect of the present invention, it is possible to provide a radio wave absorber that can contribute to improving the recognition accuracy of the radar, and a radio wave absorbing composition that can be used for manufacturing the radio wave absorber.

DESCRIPTION OF THE PREFERRED EMBODIMENTS

[Radio Wave Absorbing Composition and Radio Wave Absorber]

One aspect of the present invention relates to a radio wave absorber containing a magnetic powder and a binder. In the radio wave absorber, the magnetic powder is a powder of a hexagonal ferrite in which a ratio (σs/β) of a saturation magnetization as to a half-width β of a diffraction peak on a (107) plane is 240 $emu \cdot g^{-1} \cdot degree^{-1}$ or more, where the half-width β is determined by X-ray diffraction analysis.

In addition, one aspect of the present invention relates to a radio wave absorbing composition containing a magnetic powder and a binder. In the radio wave absorbing composition, the magnetic powder is a powder of a hexagonal ferrite in which a ratio (σs/β) of a saturation magnetization as to a half-width β of a diffraction peak on a (107) plane is 240 emu·g$^{-1}$·degree$^{-1}$ or more, where the half-width β is determined by X-ray diffraction analysis.

In the present invention and the present specification, the "radio wave" means an electromagnetic wave having a frequency of 3 terahertz (THz) or less. The radio wave absorber has radio wave absorbability. The radio wave absorbability can be evaluated, for example, by the transmission attenuation amount and/or the reflection attenuation amount, which will be described in detail later. It can be said that the higher the value of the transmission attenuation amount, the higher the value of the reflection attenuation amount, or the higher the value of the transmission attenuation amount and the value of the reflection attenuation amount, the more excellent the radio wave absorbability.

In the present invention and the present specification, the "powder" means an aggregation of a plurality of particles. The "aggregation" is not limited to a form in which particles that constitute an aggregation are in direct contact with each other, and also includes a form in which a binder or the like is interposed between the particles.

In order to improve the recognition accuracy of the radar, it is desirable to increase the directivity of the radar. Furthermore, it is desirable to enhance the selectivity of the radar by removing or reducing unnecessary radio wave components, where the selectivity is receiving radio waves selectively from an object. For the former, the higher the transmission attenuation amount of the radio wave absorber is, the more preferable it is. For the latter, the higher the reflection attenuation amount of the radio wave absorber is, the more preferable it is. From the above viewpoints, the radio wave absorber that is installed on a front side (an incident side of the radio wave incident from the outside) of the radar radio wave transmitting and receiving unit in order to improve the recognition accuracy of the radar is desired to have both a high transmission attenuation amount and a high reflection attenuation amount. However, in the conventional radio wave absorber containing a magnetic powder and a binder, the reflection attenuation amount generally tended to decrease in a case where an attempt was made to increase the transmission attenuation amount, and thus it was difficult to increase both the transmission attenuation amount and the reflection attenuation amount.

On the other hand, the inventors of the present invention repeatedly carried out studies and found that in a radio wave absorber containing a magnetic powder and a binder, in a case where a powder of a hexagonal ferrite in which a rate σs/β, which will be described in detail later, is 240 emu·g$^{-1}$·degree$^{-1}$ or more is used as the magnetic powder, both of the transmission attenuation amount and the reflection attenuation amount can be increased.

By the way, in a radio wave absorber, a metal layer may be laminated on a surface (a so-called back surface) opposite to the surface on which radio waves are incident on the radio wave absorber. Such a radio wave absorber is called a matching-type radio wave absorber. In the matching-type radio wave absorber, reflection attenuation characteristics can be enhanced by providing a metal layer to utilize the phase difference absorption. On the other hand, in the radio wave absorber, the radio wave absorber itself can have excellent reflection attenuation characteristics. Specifically, it is possible to exhibit a high reflection attenuation amount regardless of the metal layer. A radio wave absorber that is used without laminating a metal layer on the back surface is generally called a transmission-type radio wave absorber. In the conventional transmission-type radio wave absorber containing a magnetic powder and a binder, in general, the reflection attenuation amount tended to decrease in a case where an attempt was made to increase the transmission attenuation amount. On the other hand, the radio wave absorber can exhibit a high reflection attenuation amount and a high transmission attenuation amount regardless of the metal layer.

The "metal layer" described in the present specification means a layer containing a metal and substantially reflecting radio waves. However, in a case where the radio wave absorber containing a magnetic powder and a binder contains a metal, such a radio wave absorber does not correspond to the metal layer. Here, "substantially reflecting radio waves" means, for example, reflecting 90% or more of incident radio waves in a case where the radio waves are incident on the radio wave absorber in a state where a metal layer is laminated on the back surface of the radio wave absorber. Examples of the form of the metal layer include a metal plate and a metal foil. For example, a metal layer formed on the back surface of the radio wave absorber by vapor deposition can be mentioned. The radio wave absorber can be used without a metal layer being provided on the back surface. The fact that the radio wave absorber can be used without a metal layer is preferable from the viewpoint of recycling and the viewpoint of cost. In addition, the quality of the radio wave absorber that is used by laminating a metal layer on the back surface may deteriorate due to the deterioration of the metal layer, the peeling of the metal layer from the radio wave absorber. The fact that it can be used without a metal layer being provided on the back surface is also preferable in that such quality deterioration does not occur.

Hereinafter, the radio wave absorber and the radio wave absorbing composition will be described in more detail.

<Magnetic Powder>

(σs/β)

The radio wave absorber and the radio wave absorbing composition contain, as the magnetic powder, a powder of a hexagonal ferrite in which a ratio (σs/β) of a saturation magnetization as to a half-width β of a diffraction peak on a (107) plane is 240 emu·g$^{-1}$·degree$^{-1}$ or more, where the half-width β is determined by X-ray diffraction analysis.

The saturation magnetization as is also called mass magnetization, and the unit thereof is emu/g. 1 emu/g is 1 A·m$^2$/kg. The saturation magnetization as of the magnetic powder shall be a value measured using an oscillating sample magnetometer in an ambient air atmosphere of an ambient temperature of 23° C. and under conditions of a maximum applied magnetic field of 50 kOe and a magnetic field sweep rate of 25 Oe/s. 1 [kOe] is $10^6/4\pi$[A/m].

The β is the half-width of the diffraction peak on the (107) plane, which is determined by X-ray diffraction analysis of the powder of the hexagonal ferrite. The half-width is the full width at half maximum (FWHM). As a result of the study by the inventors of the present invention, it was revealed that in the diffraction plane of the hexagonal ferrite, there is a correlation between the ratio (σs/β), which is determined from the half-width β of the diffraction peak on the (107) plane, and the radio wave absorption performance. In the present invention and the present specification, the X-ray diffraction analysis shall be carried out using a powder X-ray diffractometer under the following measurement conditions. An X-ray diffraction spectrum is obtained as a spectrum having a vertical axis: intensity (unit: count) and a horizontal axis: diffraction angle (unit: degree (°)). In the X-ray diffraction spectrum, the diffraction peak on the (107) plane is detected as a peak having an apex at a position where the diffraction angle 2θ is in a range of 32 to 33 degrees (generally, near 32.5 degrees). The half-width of the diffraction peak on the (107) plane can be determined by an analysis software installed in the powder X-ray diffractometer or by a known calculation method.

—Measurement Conditions—

X-ray source: CuKα ray

[Wavelength: 1.54 Å (0.154 nm), output: 40 mA, 45 kV]

Scan range: 25 degrees$<2\theta<$35 degrees

Scan interval: 0.05 degrees

Scan speed: 0.33 degrees/min

The saturation magnetization σs is one of the magnetic properties of the magnetic powder. On the other hand, the inventors of the present invention speculate that the β can be reduced by reducing the variation in the ferrite composition among the particles that constitute the powder of the hexagonal ferrite. It is a newly obtained finding as a result of diligent studies by the inventors of the present invention that the ratio of the σs to the β affects the radio wave absorption performance of the radio wave absorber. Based on this finding, the inventors of the present invention further carried out studies repeatedly and as a result, found that in a case where a powder of a hexagonal ferrite in which σs/β is 240 $emu \cdot g^{-1} \cdot degree^{-1}$ or more is used as the magnetic powder, both of the transmission attenuation amount and reflection attenuation amount of the radio wave absorber containing a magnetic powder and a binder can be increased.

As described above, the increase in both the transmission attenuation amount and the reflection attenuation amount of the radio wave absorber can contribute to improving the recognition accuracy of the radar in which the radio wave absorber is installed. From the viewpoint of increasing both the transmission attenuation amount and the reflection attenuation amount of the radio wave absorber, the σs/β of the powder of the hexagonal ferrite is 240 $emu \cdot g^{-1} \cdot degree^{-1}$ or more In one form, the σs/β of the powder of the hexagonal ferrite is preferably 242 $emu \cdot g^{-1} \cdot degree^{-1}$ or more, more preferably 245 $emu \cdot g^{-1} \cdot degree^{-1}$ or more, still more preferably 247 $emu \cdot g^{-1} \cdot degree^{-1}$ or more, even more preferably 250 $emu \cdot g^{-1} \cdot degree^{-1}$ or more, even still more preferably 255 $emu \cdot g^{-1} \cdot degree^{-1}$ or more, and even further still more preferably 260 $emu \cdot g^{-1} \cdot degree^{-1}$ or more. In addition, the σs/β of the powder of the hexagonal ferrite can be, for example, 320 $emu \cdot g^{-1} \cdot degree^{-1}$ or less, 315 $emu \cdot g^{-1} \cdot degree^{-1}$ or less, or 310 $emu \cdot g^{-1} \cdot degree^{-1}$ or less. Alternatively, the σs/β of the powder of the hexagonal ferrite may be a value exceeding the value exemplified above. For example, a powder of a substitution-type hexagonal ferrite powder having a composition represented by Formula 1 described in detail later is preferable as the powder with which the as/0 in the above range can be obtained.

In addition, in one form, the σs/β of the powder of the hexagonal ferrite is preferably 300 $emu \cdot g^{1} \cdot degree^{-1}$ or more. For example, a powder of a substitution-type hexagonal ferrite powder having a composition represented by Formula 2 described in detail later is preferable as the powder with which σs/β of 300 $emu \cdot g^{-1} \cdot degree^{-1}$ or more can be obtained. In this form, the σs/β of the powder of the hexagonal ferrite is more preferably 300 $emu \cdot g^{-1} \cdot degree^{-1}$ or more and 400 $emu \cdot g^{-1} \cdot degree^{-1}$ or less.

Regarding σs/β, examples of one means for increasing this value include making a value of the half-width β of the diffraction peak on the (107) plane, which is determined by X-ray diffraction analysis of the powder of the hexagonal ferrite, smaller. From this point, in one form, β is preferably 0.190 degrees or less, more preferably 0.188 degrees or less, still more preferably 0.185 degrees or less, even still more preferably 0.183 degrees or less, and even further still more preferably 0.180 degrees or less. In addition, β can be, for example, 0.130 degrees or more, 0.140 degrees or more, or 0.150 degrees or more. Alternatively, β may be a value smaller than the value exemplified above. However, the value of β is not particularly limited as long as σs/β is in the range described above.

Examples of one means for increasing the value of σs/β include increasing the σs of the powder of the hexagonal ferrite. From this point, in one form, δs is, for example, preferably 42.0 emu/g or more, more preferably 42.5 emu/g or more, and still more preferably 43.0 emu/g or more. In addition, σs can be, for example, 55.0 emu/g or less, 53.0 emu/g or less, 52.0 emu/g or less, or 50.0 emu/g or less. Alternatively, as may be a value larger than the value exemplified above. However, the value of as is not particularly limited as long as σs/β is in the range described above.

The σs and β of the magnetic powder contained in the radio wave absorber can be determined by carrying out the above measurement, for example, on a magnetic powder that is used for the preparation of the radio wave absorber or a magnetic powder of the same lot as the magnetic powder. In addition, the σs and β of the magnetic powder contained in the radio wave absorber can be determined by extracting the magnetic powder from the radio wave absorber by a known method and carrying out the above measurement on the extracted magnetic powder. This point is the same for the magnetic powder contained in the radio wave absorbing composition.

Hereinafter, the powder of the hexagonal ferrite will be described in more detail.

(Constituent Atom of Hexagonal Ferrite)

In the present invention and the present specification, the "powder of a hexagonal ferrite" refers to a magnetic powder in which a hexagonal ferrite-type crystal structure is detected as the main phase by X-ray diffraction analysis. The main phase refers to a structure to which the highest intensity diffraction peak attributes in the X-ray diffraction spectrum obtained by X-ray diffraction analysis. For example, in a case where the highest intensity diffraction peak in the X-ray diffraction spectrum obtained by X-ray diffraction analysis attributes to the hexagonal ferrite-type crystal structure, it is determined that the hexagonal ferrite-type crystal structure is detected as the main phase. In a case where only a single structure is detected by X-ray diffraction analysis, this detected structure is used as the main phase. The hexagonal ferrite-type crystal structure contains at least an iron atom, a divalent metal atom, and an oxygen atom as constituent atoms. In the unsubstitution-type hexagonal ferrite, the atoms that constitute the crystal structure of the hexagonal ferrite are only the iron atom, the divalent metal atom, and the oxygen atom. On the other hand, the substitution-type hexagonal ferrite contains one or more kinds of other atoms together with the iron atom, the divalent metal atom, and the oxygen atom, as atoms that constitute the crystal structure of the hexagonal ferrite. These one or more kinds of other atoms are generally atoms that are substituted for a part of iron in the crystal structure of hexagonal ferrite. The divalent metal atom is a metal atom that is capable of being a divalent cation, as an ion, and examples thereof include an alkaline earth metal atom such as a strontium atom, a barium atom, or a calcium atom, and a lead atom. In the present invention and the present specification, the "hexagonal strontium ferrite powder" means one in which the main divalent metal atom contained in the crystal structure of the hexagonal ferrite is a strontium atom. The main divalent metal atom shall refer to a divalent metal atom that occupies the largest amount among the divalent metal atoms contained in the crystal structure of the hexagonal ferrite based on the % by atom. However, rare earth atoms shall not be included in the above divalent metal atoms. The "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

The substitution-type hexagonal ferrite contains one or more kinds of other atoms together with the iron atom, the divalent metal atom, and the oxygen atom, as atoms that constitute the crystal structure of the hexagonal ferrite. The saturation magnetization as can be controlled by the kind of the substituent atom and the content thereof. Examples of such atoms include one or more kinds of trivalent metal atoms selected from the group consisting of Al, Ga, and In, and combinations of a divalent metal atom and a tetravalent metal atom, such as Mn and Ti, Co and Ti, and Zn and Ti.

In one form, the magnetic powder can be a powder of a magnetoplumbite-type (generally referred to as an "M-type") hexagonal ferrite. The magnetoplumbite-type hexagonal ferrite has a composition represented by a composition formula: $AFe_{12}O_{19}$ in a case of being an unsubstitution-type which does not contain an atom that substitutes iron. Here, A can represent at least one kind of atom selected from the group consisting of Sr, Ba, Ca, and Pb, and also includes an aspect in which two or more of these atoms are contained in any ratio. The substitution-type hexagonal ferrite can be preferably a substitution-type hexagonal strontium ferrite.

Examples of the hexagonal ferrite preferable from the viewpoint of radio wave absorption performance include a substitution-type magnetoplumbite-type hexagonal ferrite in which a part of iron atoms of the magnetoplumbite-type hexagonal ferrite are substituted with an aluminum atom. Examples of one aspect of such a hexagonal ferrite include the substitution-type hexagonal ferrite having a composition represented by Formula 1.

$$A^1Fe_{(12-x)}Al_xO_{19} \quad \text{Formula 1}$$

In Formula 1, $A^1$ represents one or more kinds of atoms (hereinafter, also referred to as an "A atom") selected from the group consisting of Sr, Ba, Ca, and Pb, it may be only one kind of atom, it may contain two or more kinds of atoms in any ratio, and, from the viewpoint of improving the uniformity of the composition between particles that constitute the powder, it is preferably only one kind of atom.

From the viewpoint of radio wave absorption performance in the high frequency band, $A^1$ in Formula 1 is preferably one or more kinds of atoms selected from the group consisting of Sr, Ba, and Ca, and more preferably Sr.

In Formula 1, x satisfies $1.50 \leq x \leq 8.00$. From the viewpoint of radio wave absorption performance in the high frequency band, x is 1.50 or more, more preferably more than 1.50, still more preferably 2.00 or more, and even still more preferably more than 2.00. The larger the value of x is, the smaller the value of as tends to be. In addition, from the viewpoint of magnetic properties, x is 8.00 or less, preferably less than 8.00, more preferably 6.00 or less, and still more preferably less than 6.00.

Specific examples of the substitution-type hexagonal ferrite represented by Formula 1, the substitution type thereof being a magnetoplumbite type, include $SrFe_{(9.58)}Al_{(2.42)}O_{19}$, $SrFe_{(9.37)}Al_{(2.63)}O_{19}$, $SrFe_{(9.27)}Al_{(2.73)}O_{19}$, $SrFe_{(9.85)}Al_{(2.15)}O_{19}$, $SrFe_{(10.00)}Al_{(2.00)}O_{19}$, $SrFe_{(9.74)}Al_{(2.26)}O_{19}$, $SrFe_{(10.44)}Al_{(1.56)}O_{19}$, $SrFe_{(9.79)}Al_{(2.21)}O_{19}$, $SrFe_{(9.33)}Al_{(2.67)}O_{19}$, $SrFe_{(7.88)}Al_{(4.12)}O_{19}$, $SrFe_{(7.04)}Al_{(4.96)}O_{19}$, $SrFe_{(7.37)}Al_{(4.63)}O_{19}$, $SrFe_{(6.25)}Al_{(5.75)}O_{19}$, $SrFe_{(7.71)}Al_{(4.29)}O_{19}$, $Sr_{(0.80)}Ba_{(0.10)}Ca_{(0.10)}Fe_{(9.83)}Al_{(2.17)}O_{19}$, $BaFe_{(9.50)}Al_{(2.50)}O_{19}$, $CaFe_{(10.00)}Al_{(2.00)}O_{19}$, and $PbFe_{(9.00)}Al_{(3.00)}O_{19}$. In addition, specific examples thereof also include the substitution-type hexagonal strontium ferrite having a composition shown in Table 1 described later. The composition of hexagonal ferrite can be checked by high frequency inductively coupled plasma emission spectroscopy. Specific examples of the checking method include a method described in Examples described later. Alternatively, after exposing a cross-section by cutting the radio wave absorber or the like, the exposed cross-section is subjected to, for example, energy dispersive X-ray spectroscopy, whereby the composition of the magnetic powder contained in the radio wave absorber can be checked.

In addition, examples of one aspect of the substitution-type magnetoplumbite-type hexagonal ferrite in which a part of iron atoms of the magnetoplumbite-type hexagonal ferrite are substituted with an aluminum atom also include a substitution-type hexagonal ferrite having a composition represented by General Formula 2.

$$A^2Fe_{(12-y)}Al_yO_{19} \quad \text{Formula 2}$$

In Formula 2, $A^2$ represents one or more kinds of atoms selected from the group consisting of Sr, Ba, Ca, and Pb. The $A^2$ in Formula 2 is as described above for the $A^1$ in Formula 1.

In Formula 2, y satisfies $0.5 \leq y < 1.5$. From the viewpoint of radio wave absorption performance in a high frequency band near 60 GHz (for example, in a range of 55 to 66 GHz), y is 0.5 or more and preferably more than 0.8 GHz. The larger the value of y is, the smaller the value of as tends to be. In addition, from the viewpoint of magnetic properties, y is less than 1.5 and preferably 1.2 or less. Specific examples of the substitution-type hexagonal ferrite represented by Formula 2, the substitution type thereof being a magnetoplumbite type, include a substitution-type hexagonal strontium ferrite having the composition shown in Table 1 described later.

In one form, in the powder of the substitution-type hexagonal ferrite, the crystal phase can be a single crystal phase, and a plurality of crystal phases can be included. It is preferable that the crystal phase is a single phase, and it is more preferable that the powder of the hexagonal ferrite is a powder of a substitution-type hexagonal ferrite of which the substitution type is a magnetoplumbite type in which the crystal phase is a single phase.

The case where the "crystal phase is a single phase" refers to a case where only one kind of diffraction pattern showing any crystal structure is observed in the X-ray diffraction analysis. The X-ray diffraction analysis can be carried out, for example, by the method described in Examples described later. In a case where a plurality of crystal phases are included, two or more kinds of diffraction patterns showing any crystal structure are observed in the X-ray diffraction analysis. Regarding the attribution of the diffraction pattern, for example, a database of the International Centre for Diffraction Data (ICDD, registered trade name) can be referenced. For example, regarding the diffraction pattern of the magnetoplumbite-type hexagonal ferrite containing Sr, "00-033-1340" of the International Centre for Diffraction Data (ICDD) can be referred to. However, in a case where a part of iron atoms are substituted with a substituent atom such as an aluminum atom, the peak position shifts from the peak position observed in a case where the substituent atom is not included.

(Method of Producing Powder of Hexagonal Ferrite)

Examples of the method of producing a powder of a hexagonal ferrite include a solid phase method and a liquid phase method. The solid phase method is a method of producing a powder of a hexagonal ferrite by sintering a mixture obtained by mixing a plurality of solid raw materials in a dry-type manner. On the other hand, the liquid phase method includes a step of using a solution. The powder of the hexagonal ferrite can be produced according to a solid phase method or a liquid phase method. The powder of the hexagonal ferrite, which has been produced according to the solid phase method, can be easily distinguished from the powder of the hexagonal ferrite, which has been produced according to the liquid phase method. For example, the powder of the hexagonal ferrite, which has been produced according to the liquid phase method, is generally subjected to scanning electron microscope-energy dispersive X-ray spectroscopy (SEM-EDX) analysis due to the production method thereof, whereby precipitates of alkali metal salts can be confirmed on the surface of particles that constitute the powder. In addition, for example, in a case where the powder of the hexagonal ferrite, which has been produced according to the solid phase method, is subjected to the morphological observation of particles by using a field emission-scanning electron microscope (FE-SEM), so-called amorphous particles can be usually confirmed. For example, as described above, the powder of the hexagonal ferrite, which has been produced according to the solid phase method, can be easily distinguished from the powder of the hexagonal ferrite, which has been produced according to the liquid phase method. In one form, from the viewpoint of mass productivity, the powder of the hexagonal ferrite is preferably a powder of the hexagonal ferrite, which has been produced according to the solid phase method.

Examples of the solid raw material that is used in the solid phase method include a compound of an iron atom and a compound of an A atom, and further include a compound of a substituent atom in a case of producing a powder of a substitution-type hexagonal ferrite. These compounds can be an oxide, a carbonate, or the like.

The A atom and the substituent atom are as described above. The mixing ratio between a plurality of solid raw materials may be determined according to the desired hexagonal ferrite composition. A raw material mixture can be obtained by mixing a plurality of solid raw materials at the same time or sequentially mixing them in any order, and stirring the resultant mixture. The stirring of the solid raw materials can be carried out by a commercially available stirring device or a stirring device having a known configuration. In a case of adjusting stirring conditions of the above stirring, it is possible to control the half-width $\beta$ of the diffraction peak on the (107) plane of the hexagonal ferrite powder to be produced. In a case where a strong stirring force is applied (for example, in a case where the rotation speed during stirring is increased), the value of $\beta$ tends to be decreased. In addition, in a case where the stirring time is lengthened, the value of $\beta$ tends to be decreased. As an example, the rotation speed during stirring can be set in a range of 300 to 3,000 rotations per minute (rpm), and the stirring time can be set in a range of 10 minutes to 90 minutes. However, the rotation speed and the stirring time during stirring may be set according to the configuration of the stirring device to be used, and they are not limited to the range exemplified above. The above mixing and stirring can be carried out, for example, in an ambient air atmosphere at room temperature. In the invention and the present specification, the "room temperature" means a temperature in a range of 20° C. to 27° C.

After the above stirring, the obtained raw material mixture can be sintered. In this sintering, the crystallization of the raw material mixture can be promoted, whereby the crystal structure of the hexagonal ferrite can be formed. Regarding the sintering conditions, the sintering temperature can be set, for example, in a range of 1,000° C. to 1,500° C. The sintering temperature can be, for example, the ambient temperature inside the device in which sintering is carried out (for example, the temperature inside the heating furnace). The sintering time can be in a range of 1 hour to 6 hours. However, the above ranges are described as examples, and the sintering may be carried out under conditions under which the crystal structure of the hexagonal ferrite is capable of being formed. The sintering can be carried out, for example, in an ambient air atmosphere.

In the sintering, it is also possible to add a fusing agent to the powder of the raw material mixture and sinter it. As the fusing agent, various fusing agents can be used, and examples thereof include $SrCl_2 \cdot 6H_2O$, $CaCl_2 \cdot 2H_2O$, $MgCl_2$, KCl, NaCl, $BaCl_2 \cdot 2H_2O$, and $Na_2B_4O_7$. The adding amount thereof is, for example, preferably 0.1 to 10 parts by mass and more preferably 0.1 to 8.0 parts by mass with respect to 100 parts by mass of the powder of the raw material mixture.

The raw material mixture before sintering can be subjected to a pulverizing step, and/or the sintered product after the sintering can be subjected to a pulverizing step. In a case of carrying out the pulverization step, it is possible to adjust the size of the particles that constitute the powder of the hexagonal ferrite. The pulverization can be carried out with a known pulverizing unit such as a mortar and pestle or a pulverizer (a cutter mill, a ball mill, a bead mill, a roller mill, a jet mill, a hammer mill, an attritor, or the like).

The obtained powder of the hexagonal ferrite may be subjected to surface treatment with a known surface treatment agent, as necessary, or can be used for preparing a radio wave absorbing composition without surface treatment.

Examples of the kinds of surface treatment include an oil treatment using hydrocarbon oil, ester oil, lanolin, or the like; a silicone treatment with dimethylpolysiloxane, methylhydrogenpolysiloxane, methylphenylpolysiloxane, or the like; a fluorine compound treatment using a perfluoroalkyl group-containing ester, perfluoroalkylsilane, a polymer having a perfluoropolyether and a perfluoroalkyl group, or the like; a silane coupling agent treatment using 3-methacryloxypropyltrimethoxysilane, 3-glycidoxypropyltrimethoxysilane, N-2-(aminoethyl)-3-aminopropyltrimethoxysilane, or the like; a titanium coupling agent treatment using isopropyltriisostearoyl titanate, isopropyltris(dioctylpyrophosphate)titanate, or the like; a metal soap treatment; an amino acid treatment using acylglutamic acid or the like; a lecithin treatment using hydrogenated egg yolk lecithin or the like; a polyethylene treatment; a mechanochemical treatment; and a phosphoric acid compound treatment using phosphoric acid, phosphorous acid, a phosphate, a phosphite, or the like.

Among these, a phosphoric acid compound treatment is preferable as the surface treatment. In a case where the powder of the hexagonal ferrite is subjected to a phosphoric acid compound treatment, it is possible to thickly form a highly polar layer on the surface of the particle that constitutes the powder. In a case where a highly polar layer is formed on the surface of the particles, the cohesion due to hydrophobic interaction between the particles can be suppressed, and thus it is possible to more effectively suppress the increase in the viscosity of the radio wave absorbing composition. As a result, in the case of the powder subjected to the phosphoric acid compound treatment, the decrease in the fluidity of the radio wave absorbing composition due to the incorporation of a large amount of the powder is difficult to occur, and the handleability and the workability tend to be hardly impaired. Further, in a case where a highly polar layer is formed on the surface of the particles, not only the cohesion of the particles can be suppressed, but also the affinity between the powder and the binder can be further enhanced, and thus it is possible to disperse the powder more uniformly in the binder. Therefore, in the radio wave absorber formed from the radio wave absorbing composition containing the powder subjected to the phosphoric acid compound treatment, the variation in the radio wave absorption performance tends to hardly occur, and an excellent mechanical strength is exhibited.

In addition to phosphoric acid, the phosphoric acid compound includes phosphorous acid, hypophosphorous acid, pyrophosphoric acid, a linear polyphosphoric acid, a cyclic metaphosphoric acid, and salts thereof. In a case where the phosphoric acid compound has a form of a salt, the phosphoric acid compound is preferably a metal salt. The metal salt is not particularly limited, and examples thereof include an alkali metal salt and an alkaline earth metal salt. In addition, the phosphoric acid compound may be an ammonium salt.

In the phosphoric acid compound treatment, only one kind of phosphoric acid compound may be used, or two or more kinds thereof may be used.

In the phosphoric acid compound treatment, the phosphoric acid compound is generally mixed with a chelating agent, a neutralizing agent, and the like to be used as the surface treatment agent.

In the phosphoric acid compound treatment, as the surface treatment agent, an aqueous solution containing a phosphoric acid compound that is generally commercially available can also be used.

The phosphoric acid compound treatment of the powder can be carried out, for example, by mixing the powder and a surface treatment agent containing a phosphoric acid compound. Conditions such as mixing time and temperature may be appropriately set depending on the intended purpose. In the phosphoric acid compound treatment, an insoluble phosphoric acid compound is precipitated on the surface of particles that constitute the powder by utilizing the dissociation (the equilibrium) reaction of the phosphoric acid compound.

Regarding the phosphoric acid compound treatment, for example, "Surface Technology", Vol. 61, No. 3, p 216, 2010, or "Surface Technology", Vol. 64, No. 12, p 640, 2013 can be referenced.

Further, as the surface treatment, a silane coupling agent treatment is also preferable.

The silane coupling agent is preferably a silane coupling agent having a hydrolyzable group.

In the silane coupling agent treatment using a silane coupling agent having a hydrolyzable group, the hydrolyzable group in the silane coupling agent is hydrolyzed by water to become a hydroxy group, and this hydroxy group undergoes a dehydrative condensation reaction with a hydroxyl group on the surface of the silica particles, whereby the surface of the particles can be modified.

Examples of the hydrolyzable group include an alkoxy group, an acyloxy group, and a halogeno group.

The silane coupling agent may have a hydrophobic group as a functional group.

Examples of the silane coupling agent having a hydrophobic group as a functional group include alkoxysilanes such as methyltrimethoxysilane (MTMS), dimethyldimethoxysilane, phenyltrimethoxysilane, methyltriethoxysilane, dimethyldiethoxysilane, phenyltriethoxysilane, n-propyltrimethoxysilanes, n-propyltriethoxysilane, hexyltrimethoxysilane, hexyltriethoxysilane, and decyltrimethoxysilane; chlorosilanes such as methyltrichlorosilane, dimethyldichlorosilane, trimethylchlorosilane, and phenyltrichlorosilane; and hexamethyldisilazane (HMDS).

Further, the silane coupling agent may have a vinyl group as a functional group.

Examples of the silane coupling agent having a vinyl group as a functional group include alkoxysilanes such as methacryloxypropyltriethoxysilane, methacryloxypropyltrimethoxysilane, methacryloxypropylmethyldiethoxysilane, methacryloxypropylmethyldimethoxysilane, vinyltriethoxysilane, vinyltrimethoxysilane, vinylmethyldimethoxysilane; chlorosilanes such as vinyltrichlorosilane and vinylmethyldichlorosilane; and divinyltetramethyldisilazane.

In the silane coupling agent treatment, only one kind of silane coupling agent may be used, or two or more kinds thereof may be used.

In addition to the above compounds, examples of the surface treatment agent include the compounds described in paragraphs 0061 to 0063 of JP2017-41624A.

The surface treatment method is not particularly limited, and a known method can be applied.

Examples of the surface treatment method include a method of mixing a powder and a surface treatment agent using a mixer such as a henschel mixer, a method of spraying a surface treatment agent or the like on particle that constitutes the powder, and a method of mixing a liquid containing a surface treatment agent or the like, which is obtained by dissolving or dispersing a surface treatment agent or the like in an appropriate solvent, with a powder, and then removing the solvent.

(Volume Filling Rate of Magnetic Powder)

The radio wave absorber and the radio wave absorbing composition contain, as the magnetic powder, a powder of the hexagonal ferrite described above. In the radio wave absorber and the radio wave absorbing composition, the filling rate of the powder of the hexagonal ferrite is not particularly limited. For example, in one form, the filling rate can be 35% by volume or less and can be also in a range of 15% to 35% by volume in terms of the volume filling rate. In addition, in another form, the volume filling rate can be 35% by volume or more. In this case, the volume filling rate can be, for example, in a range of 35% to 60% by volume, and it can also be in a range of 35% to 50% by volume. Regarding the radio wave absorber, the volume filling rate described above means a volume-based content with respect to the total volume (100% by volume) of the radio wave absorber.

Regarding the radio wave absorbing composition, the volume filling rate means a volume-based content of solid contents (that is, components excluding the solvent) with respect to the total volume (100% by volume) of the radio wave absorber.

According to the study of the inventors of the present invention on the filling rate of the magnetic powder, the transmission attenuation amount tends to be increased by increasing the filling rate of the magnetic powder in the radio wave absorber. On the other hand, according to the study of the inventors of the present invention, in the conventional radio wave absorber containing a magnetic powder and a binder, the reflection attenuation amount tends to be decreased in a case where the filling rate of the magnetic powder in the radio wave absorber is increased. On the other hand, in a case where the powder of the hexagonal ferrite described above is used as a magnetic powder, both the transmission attenuation amount and reflection attenuation amount of the radio wave absorber containing a magnetic powder and a binder can be increased.

For example, the magnetic powder is collected from the radio wave absorber by a known method, and the volume filling rate of the magnetic powder in the radio wave absorber can be determined as "(the volume of the collected magnetic powder/the total volume of the radio wave absorber)×100". Here, the total volume of the radio wave absorber and the volume of the magnetic powder can be determined by a known method. Alternatively, in a case where the composition of the radio wave absorbing composition used for preparing a radio wave absorber is known, the volume filling rate of the magnetic powder in the radio wave absorber can be determined from this known composition.

In addition, the volume filling rate of the magnetic powder in the radio wave absorber can also be determined by the following method using a cross-section SEM image acquired by a scanning electron microscope (SEM).

A measurement sample having a square plane, one side of which has a length of 5 mm, is cut out from a randomly determined position of the radio wave absorber to be measured. A sample for cross-section observation is prepared from the cut-out sample. The sample for cross-section observation is prepared by focused ion beam (FIB) processing. The prepared cross-section observation sample is observed by SEM, and a cross-section image (SEM image) is taken. As the SEM, a field emission scanning electron microscope (FE-SEM) is used. Using the FE-SEM, a cross-section observation sample is set on a stage so that the FIB-processed cross-section faces upward, and a cross-section SEM image with a visual field of 30 μm×40 μm is obtained under the conditions of an acceleration voltage of 15 kV and an observation magnification of 3,000 folds. The obtained cross-section SEM image is subjected to binarization processing, and the proportion (in terms of the area) of the magnetic powder is calculated.

The above operation is carried out on five measurement samples cut out from different positions of the radio wave absorber to be measured, and the volume filling rate of the magnetic powder can be determined as the arithmetic mean of the obtained five values. As necessary, the elemental analysis of the cross-section observation sample is carried out to specify the portion of the magnetic powder in the cross-section SEM image.

The volume filling rates of the other components described in the present specification can also be determined in the same manner as described above.

<Binder>

The radio wave absorber and the radio wave absorbing composition contain the magnetic powder and the binder. The binder can be, for example, a resin, and examples of the resin include a thermoplastic resin and a thermosetting resin.

Examples of the thermoplastic resin include an acrylic resin, polyacetal, polyamide, polyethylene, polypropylene, polyethylene terephthalate, polybutylene terephthalate, polycarbonate, polystyrene, polyphenylene sulfide, polyvinyl chloride, an acrylonitrile butadiene styrene (ABS) resin obtained by copolymerization of acrylonitrile, butadiene, and styrene; and an acrylonitrile styrene (AS) resin obtained by copolymerization of acrylonitrile and styrene.

Examples of the thermosetting resin include a phenol resin, an epoxy resin, a melamine resin, a urea resin, an unsaturated polyester, a diallyl phthalate resin, a urethane resin, and a silicon resin.

The binder can also be rubber. From viewpoints that the mixability with the magnetic powder is good and the radio wave absorber having more excellent durability, weather fastness, and impact resistance can be produced, examples of the rubber include butadiene rubber, isoprene rubber, chloroprene rubber, halogenated butyl rubber, fluororubber, urethane rubber, acrylic rubber (abbreviation: ACM) obtained by copolymerization of an acrylic acid ester (for example, ethyl acrylate, butyl acrylate, or 2-ethylhexyl acrylate) and another monomer, ethylene-propylene rubber obtained by coordination polymerization of ethylene and propylene using a Ziegler catalyst, butyl rubber (abbreviation: IIR) obtained by copolymerization of isobutylene and isoprene, styrene butadiene rubber (abbreviation: SBR) obtained by copolymerization of butadiene and styrene, acrylonitrile butadiene rubber (abbreviation: NBR) obtained by copolymerization of acrylonitrile and butadiene, and silicone rubber.

In a case where the radio wave absorber of the present disclosure contains rubber as the binder, it may contain various additives such as a vulcanizing agent, a vulcanization aid, a softener, and a plasticizer, in addition to the rubber. Examples of the vulcanizing agent include sulfur, an organic sulfur compound, and a metal oxide.

Examples of the binder include a thermoplastic elastomer (TPE). Examples of the thermoplastic elastomer include an olefin-based thermoplastic elastomer (a thermoplastic olefinic elastomer (TPO)), a styrene-based thermoplastic elastomer (a thermoplastic styrenic elastomer (TPS)), an amide-based thermoplastic elastomer (a thermoplastic polyamide elastomer (TPA), and a polyester-based thermoplastic elastomer (a thermoplastic copolyester (TPC)).

The radio wave absorber and the radio wave absorbing composition may include only one kind of binder and may include two or more kinds thereof. The volume filling rate of the binder in the radio wave absorber and the radio wave absorbing composition is not particularly limited, and it is, for example, preferably 65% by volume or more, more preferably 65% by volume or more and 92% by volume or less, and still more preferably 65% by volume or more and 85% by volume or less. In a case where the radio wave absorber and the radio wave absorbing composition contain two or more kinds of binders, the volume filling rate means the total volume filling rate of the two or more kinds of binders. This point also identically applies to the volume filling rates of other components.

<Additive>

The radio wave absorber and the radio wave absorbing composition contain a magnetic powder and a binder, and they may randomly contain or may not contain one or more additives in any proportion. Examples of the additive include an antioxidant, a light stabilizer, a dispersing agent, a dispersing aid, a fungicide, an antistatic agent, a plasticizer, an impact resistance improver, a crystal nucleating agent, a lubricant, a surfactant, a pigment, a dye, a filler, a mold release agent (fatty acid, a fatty acid metal salt, an oxyfatty acid, a fatty acid ester, an aliphatic partially saponified ester, paraffin, a low molecular weight polyolefin, a fatty acid amide, an alkylenebis fatty acid amide, an aliphatic ketone, a fatty acid lower alcohol ester, a fatty acid polyhydric alcohol ester, a fatty acid polyglycol ester, a modified silicone, and the like), a processing aid, an antifogging agent, a drip inhibitor, and an antibacterial agent. One component of the other additives may carry out two or more functions.

(Antioxidant)

In one form, examples of the preferred additive include an antioxidant.

The antioxidant is not particularly limited, and a known antioxidant can be used.

Examples of the antioxidant are described in, for example, "Comprehensive Technology for Polymer Stabilization—Mechanism and Application Development—" published by CMC Publishing Co., Ltd., supervised by Yasukazu Okatsu. This description is incorporated in the present specification by reference.

Examples of the kind of antioxidant include a phenol-based antioxidant, an amine-based antioxidant, a phosphorus-based antioxidant, and a sulfur-based antioxidant.

As the antioxidant, it is preferable to use a phenol-based antioxidant and/or an amine-based antioxidant in combination with a phosphorus-based antioxidant and/or a sulfur-based antioxidant.

Examples of the phenol-based antioxidant include ADEKA STAB AO-20, ADEKA STAB AO-30, ADEKA STAB AO-40, ADEKA STAB AO-50, ADEKA STAB AO-60, ADEKA STAB AO-80, and ADEKA STAB AO-330, manufactured by ADEKA Corporation; and IRGANOX 1010, IRGANOX 1035, IRGANOX 1076, IRGANOX 1098, IRGANOX 1135, IRGANOX 1330, IRGANOX 1726, IRGANOX 245, IRGANOX 259, IRGANOX 3114, and IRGANOX 565, manufactured by BASF Japan Ltd. The above "ADEKA STAB" and "IRGANOX" are both registered trade names.

Examples of the amine-based antioxidants include Sanol LS-770, Sanol LS-765, and Sanol LS-2626, manufactured by Mitsubishi-Chemical Foods Corporation; ADEKA STAB LA-77, ADEKA STAB LA-57, ADEKA STAB LA-52, ADEKA STAB LA-62, ADEKA STAB LA-63, ADEKA STAB LA-67, ADEKA STAB LA-68, and ADEKA STAB LA-72, manufactured by ADEKA Corporation; and TINUVIN 123, TINUVIN 144, TINUVIN 622, TINUVIN 765, and TINUVIN 944, manufactured by BASF Japan Ltd. The above "ADEKA STAB" and "TINUVIN" are both registered trade names.

Further, an amine-based compound capable of quenching radicals can also be used as the antioxidant. Examples of such an amine-based compound include polyethylene glycol bis TEMPO [Sigma-Aldrich Co., LLC] and sebacic acid bis TEMPO. Here, "TEMPO" is an abbreviation for tetramethylpiperidin-1-oxyl.

Examples of the phosphorus-based antioxidant include ADEKA STAB PEP-8, ADEKA STAB PEP-36, ADEKA STAB HP-10, and ADEKA STAB 2112, manufactured by ADEKA Corporation; and IRGAFOS 168 manufactured by BASF Japan Ltd. The above "ADEKA STAB" and "IRGAFOS" are both registered trade names.

Examples of the sulfur-based antioxidant include ADEKA STAB AO-412S and ADEKA STAB AO-503S, manufactured by ADEKA Corporation. The above "ADEKA STAB" is a registered trade name.

Among the above, the phenol-based antioxidant is preferably at least one selected from the group consisting of ADEKA STAB AO-20, ADEKA STAB AO-60, ADEKA STAB AO-80, and IRGANOX 1010, the amine-based antioxidant is preferably ADEKA STAB LA-52, the phosphorus-based antioxidant is preferably ADEKA STAB PEP-36, and the sulfur-based antioxidant is preferably ADEKA STAB AO-412S.

In a case of containing an antioxidant, the radio wave absorber and the radio wave absorbing composition may contain only one kind of antioxidant or may contain two or more kinds of antioxidants.

In a case where the above radio wave absorber and radio wave absorbing composition contain an antioxidant, the content of the antioxidant in the radio wave absorber and the radio wave absorbing composition is not particularly limited, and it is, for example, preferably 0.1 parts by mass to 10 parts by mass and more preferably 0.5 parts by mass to 5 parts by mass with respect to 100 parts by mass of the binder from the viewpoint of both suppressing the decomposition of the binder and suppressing the bleeding of the antioxidant.

(Light Stabilizer)

In one form, examples of the preferred additive include a light stabilizer.

Examples of the light stabilizer include HALS (that is, a hindered amine-based light stabilizer), an ultraviolet absorbing agent, and a singlet oxygen quencher.

The HALS may be a high molecular weight HALS, a low molecular weight HALS, or a combination of a high molecular weight HALS and a low molecular weight HALS.

In a case of containing a light stabilizer, the radio wave absorber and the radio wave absorbing composition may contain only one kind of light stabilizer or may contain two or more kinds thereof.

—High Molecular Weight HALS—

In the present invention and the present specification, the "high molecular weight HALS" means a hindered amine-based light stabilizer having a weight-average molecular weight of more than 1,000.

Examples of the high molecular weight HALS include, as an oligomer-type HALS, poly [6-(1,1,3,3-tetramethylbutyl) imino-1,3,5-triazine-2,4-di-yl][(2,2,6,6-tetramethyl-4-piperidyl)imino]hexamethylene [(2,2,6,6-tetramethyl-4-piperidyl)imino] and dimethyl succinate-1-(2-hydroxyethyl)-4-hydroxy-2,2,6,6-tetramethylpiperidine polycondensate.

Examples of the commercially available high molecular weight HALS product include CHIMASSORB 944LD and TINUVIN 622LD, manufactured by BASF Japan Ltd. The above "CHIMASSORB" and "TINUVIN" are both registered trade names.

The weight-average molecular weight (Mw) in the present invention and the present specification is a value measured by gel permeation chromatography (GPC). For the measurement using the gel permeation chromatography (GPC), HLC (registered trade mark) −8220GPC [manufactured by Tosoh Corporation] is used as the measurement device, TSKgel (registered trade mark) Super HZM-M [4.6 mm ID×15 cm, manufactured by Tosoh Corporation], Super HZ4,000 [4.6 mm ID×15 cm, manufactured by Tosoh Corporation], Super HZ3,000 [4.6 mm ID×15 cm, manufactured by Tosoh Corporation], and Super HZ2,000 [4.6 mm ID×15 cm, Tosoh Corporation] are connected one by one in series and used as the column, and tetrahydrofuran (THF) can be used as the eluent.

The measurement conditions can be a sample concentration of 0.2% by mass, a flow rate of 0.35 mL/min, a sample injection amount of 10 μL, and a measurement temperature of 40° C., and a differential refractive index (RI) detector can be used as the detector.

The calibration curve can be created using "Standard sample TSK standard, polystyrene": "F-40", "F-20", "F-4", "F-1", "A-5000", "A-2500", and "A-1000", manufactured by Tosoh Corporation.

In a case where the above radio wave absorber contains a high molecular weight HALS, the content of the high molecular weight HALS in the radio wave absorber is not particularly limited, and it is, for example, preferably 0.2% by mass to 10% by mass with respect to the total mass of the radio wave absorber.

The content of the high molecular weight HALS in the above radio wave absorber is preferably 0.2% by mass or more with respect to the total mass of the radio wave absorber from the viewpoint of improving weather fastness.

In a case where the content of the high molecular weight HALS in the radio wave absorber is 10% by mass or less with respect to the total mass of the radio wave absorber, the decrease in mechanical strength and the occurrence of blooming tend to be capable of being suppressed.

—Low Molecular Weight HALS—

In the present invention and the present specification, the "low molecular weight HALS" means a hindered amine-based light stabilizer having a molecular weight of 1,000 or less (preferably 900 or less and more preferably 600 to 900).

Examples of the low molecular weight HALS include tris(2,2,6,6-tetramethyl-4-piperidyl)benzene-1,3,5-tricarboxylate, tris(2,2,6,6-tetramethyl-4-piperidyl)-2-acetoxypropane-1,2,3-tricarboxylate, tris(2,2,6,6-tetramethyl-4-piperidyl)-2-hydroxypropane-1,2,3-tricarboxylate, tris(2,2,6,6-tetramethyl-4-piperidyl)triazine-2,4,6-tricarboxylate, tris(2,2,6,6-tetramethyl-4-piperidyl)butane-1,2,3-tricarboxylate, tetrakis(2,2,6,6-tetramethyl-4-piperidyl)propane-1,1,2,3-tetracarboxylate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, and 2-(3,5-di-t-butyl-4-hydroxybenzyl)-2-n-butylmalonate bis(1,2,2,6,6-pentamethyl-4-piperidyl).

Examples of the commercially available low molecular weight HALS product include ADEKA STAB LA-57, and ADEKA STAB LA-52, manufactured by ADEKA Corporation; and TINUVIN 144 manufactured by BASF Japan Ltd. The above "ADEKA STAB" and "TINUVIN" are both registered trade names.

In a case where the above radio wave absorber contains a low molecular weight HALS, the content of the low molecular weight HALS in the radio wave absorber is not particularly limited; however, it is, for example, preferably 0.2% by mass to 10% by mass with respect to the total mass of the radio wave absorber.

The content of the low molecular weight HALS in the above radio wave absorber is preferably 0.2% by mass or more with respect to the total mass of the radio wave absorber from the viewpoint of improving weather fastness.

In a case where the content of the low molecular weight HALS in the radio wave absorber is 10% by mass or less with respect to the total mass of the radio wave absorber, the decrease in mechanical strength and the occurrence of blooming tend to be capable of being suppressed.

—Ultraviolet Absorbing Agent—

Examples of the ultraviolet absorbing agent include benzotriazole-based ultraviolet absorbing agents such as 2-(2'-hydroxy-3',5'-di-t-butylphenyl)benzotriazole, 2-(3,5-di-t-amyl-2-hydroxyphenyl)benzotriazole, 2-(2'-hydroxy-5'-methyl-phenyl)benzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3",4",5",6"-tetrahydrophthalimidemethyl)-5'-methylphenyl]benzotriazole, 2,2'-methylenebis[4-(1,1,3,3-tetramethylbutyl)-6-(2H-benzotriazole-2-yl)phenol], 2-[2-hydroxy-3,5-bis(α,α-dimethylbenzyl)phenyl]-2H-benzotriazole, 2-(2-hydroxy-4-octyloxyphenyl)-2H-benzotriazole, and 2-(2H-benzotriazole-2-yl)-4-methyl-6-(3,4,5,6-tetrahydrophthalimidylmethyl)phenol; benzophenone-based ultraviolet absorbing agents such as 2-hydroxy-4-methoxybenzophenone, 2,4-dihydroxybenzophenone, 2,2'-dihydroxy-4-methoxybenzophenone, 2,2'-dihydroxy-4,4'-dimethoxybenzophenone, 2-hydroxy-4-n-octoxybenzophenone, 2,2',4,4'-tetrahydroxybenzophenone, 4-dodecyloxy-2-hydroxybenzophenone, a 3,5-di-t-butyl-4-(hydroxybenzoyl) benzoic acid n-hexadecyl ester, 1,4-bis(4-benzoyl-3-hydroxyphenoxy)butane, 1,6-bis(4-benzoyl-3-hydroxyphenoxy)hexane; and cyanoacrylate-based ultraviolet absorbing agents represented by ethyl-2-cyano-3,3-diphenylacrylate.

Examples of the commercially available ultraviolet absorbing agent include TINUVIN 320, TINUVIN 328, TINUVIN 234, TINUVIN 1577, TINUVIN 622, and IRGANOX series, manufactured by BASF Japan Ltd.; ADEKA STAB LA31 manufactured by ADEKA Corporation; and SEESORB 102, SEESORB 103, and SEESORB 501, manufactured by SHIPRO KASEI KAISHA, Ltd. The above-described "TINUVIN", "IRGANOX", "ADEKA STAB", and "SEESORB" are all registered trade names.

In a case where the above radio wave absorber contains an ultraviolet absorbing agent, the content of the ultraviolet absorbing agent in the radio wave absorber is not particularly limited, and it is, for example, preferably 0.2% by mass to 10% by mass with respect to the total mass of the radio wave absorber.

The content of the ultraviolet absorbing agent in the above radio wave absorber is preferably 0.2% by mass or more with respect to the total mass of the radio wave absorber from the viewpoint of improving weather fastness.

In a case where the content of the ultraviolet absorbing agent in the radio wave absorber is 10% by mass or less with respect to the total mass of the radio wave absorber, the decrease in mechanical strength and the occurrence of blooming tend to be capable of being suppressed.

—Singlet Oxygen Quencher—

In a case where the above radio wave absorber contains a singlet oxygen quencher, the content of the singlet oxygen quencher in the radio wave absorber is not particularly limited, and it is, for example, preferably 0.2% by mass to 10% by mass with respect to the total mass of the radio wave absorber.

The content of the singlet oxygen quencher in the above radio wave absorber is preferably 0.2% by mass or more with respect to the total mass of the radio wave absorber from the viewpoint of improving weather fastness.

In a case where the content of the singlet oxygen quencher in the radio wave absorber is 10% by mass or less with respect to the total mass of the radio wave absorber, the decrease in mechanical strength and the occurrence of blooming tend to be capable of being suppressed.

In a case of containing a light stabilizer, the above radio wave absorber may contain only one kind of light stabilizer or may contain two or more kinds of light stabilizers.

<Methods of Producing Radio Wave Absorbing Composition and Radio Wave Absorber>

The methods of manufacturing the radio wave absorbing composition and the radio wave absorber are not particularly limited. The radio wave absorbing composition of the present disclosure can be manufactured according to a known method using the magnetic powder, a binder, and, as necessary, a solvent, an additive. For example, the radio wave absorber can be a molded product formed by molding the radio wave absorbing composition. The radio wave absorbing composition can be prepared as a kneaded material by kneading, while heating, a mixture of the magnetic powder, the binder, and, as necessary, a solvent, additives. The kneaded material can be obtained in any shape such as an aggregate shape or a pellet shape. The kneaded material is molded into a desired shape by a known molding method such as extrusion molding, press molding, injection molding, or in-mold forming, whereby a radio wave absorber (a molded product) can be obtained. The shape of the radio wave absorber is not particularly limited and may be any shape such as a plate shape or a linear shape. The "plate shape" includes a sheet shape and a film shape. The plate-shaped radio wave absorber can also be called a radio wave absorbing plate, a radio wave absorbing sheet, a radio wave absorbing film, or the like. The radio wave absorber may be a radio wave absorber having a single composition (for example, a single-layer radio wave absorbing plate) or a combination of two or more parts having different compositions (for example, a laminate). Further, the radio wave absorber may have a planar shape, may have a three-dimensional shape, or may be a combination of a portion having a planar shape and a portion having a three-dimensional shape. Examples of the planar shape include a sheet shape and a film shape. Examples of the three-dimensional shape include a tubular shape (a cylindrical shape, rectangular tubular shape, or the like), a horn shape, and a box shape (for example, at least one of the surfaces thereof is open).

For example, the thickness of the radio wave absorber is preferably 20 mm or less, more preferably 10 mm or less, and still more preferably 5 mm or less, from the viewpoint of easiness of handling. From the viewpoint of mechanical properties, the thickness is preferably 1 mm or more and more preferably 2 mm or more. In a case where the thickness of the radio wave absorber is adjusted, for example, the transmission attenuation amount described later can be adjusted. In a case where the radio wave absorber is a laminate, the thickness means the total thickness of the radio wave absorber constituting the laminate. The thickness of the radio wave absorber is a value measured using a digital length measuring machine and, specifically, is an arithmetic mean of the measured values measured at nine points which are randomly selected.

The radio wave absorbing composition may contain or may not contain a solvent. In a case where the radio wave absorbing composition contains a solvent, the solvent is not particularly limited, and examples thereof include water, an organic solvent, and a mixed solvent of water and an organic solvent.

Examples of the organic solvent include alcohols such as methanol, ethanol, n-propanol, i-propanol, and methoxypropanol, ketones such as acetone, methyl ethyl ketone, and cyclohexanone, tetrahydrofuran, acetonitrile, ethyl acetate, and toluene. Among these, the solvent is preferably ketones and more preferably cyclohexanone from the viewpoint of drying rate. In a case where the radio wave absorbing composition contains a solvent, the content of the solvent in the composition is not particularly limited and may be determined depending on the powder of producing a radio wave absorber.

The radio wave absorbing composition can be prepared by mixing the above components. The mixing method is not particularly limited, and examples thereof include a method of mixing by stirring. As the stirring unit, a known stirring device can be used. Examples of the stirring device include mixers such as a paddle mixer and an impeller mixer. The stirring time may be set depending on the kind of the stirring device, the composition of the radio wave absorbing composition.

Examples of one form of the powder of producing the radio wave absorber include a method of molding the radio wave absorbing composition into a desired shape by a known molding method as exemplified above.

In addition, examples of another form of the powder of producing the radio wave absorber include a method of applying the radio wave absorbing composition onto a support and producing the radio wave absorber as a radio wave absorbing layer. The support that is used here may be removed before the radio wave absorber is incorporated into an article to which the radio wave absorbability should be imparted or may be incorporated into the article together with the radio wave absorber without being removed.

The support is not particularly limited, and a well-known support can be used. Examples of the support include a metal plate (a plate of metal such as aluminum, zinc, or copper), a glass plate, a plastic sheet [a sheet of polyester (polyethylene terephthalate, polyethylene naphthalate, or polybutylene terephthalate), polyethylene (linear low-density polyethylene, low-density polyethylene, or high-density polyethylene), polypropylene, polystyrene, polycarbonate, polyimide, polyamide, polyamide imide, polysulfone, polyvinyl chloride, polyacrylonitrile, polyphenylene sulfide, polyether imide, polyether sulfone, polyvinyl acetal, or an acrylic resin], a plastic sheet on which the metal exemplified in the metal plate described above is laminated or vapor-deposited. The plastic sheet is preferably biaxially stretched. The shape, structure, size, and the like of the support can be appropriately selected. Examples of the shape of the support include a plate shape. The structure of the support may be a monolayer structure or a laminated structure of two or more layers. The size of the support can be appropriately selected depending on the size of the radio wave absorber. The thickness of the support is generally approximately 0.01 mm to 10 mm, for example, preferably 0.02 mm to 3 mm and more preferably 0.05 mm to 1 mm, from the viewpoint of handleability.

The method of applying the radio wave absorbing composition on a support is not particularly limited, and examples thereof include methods using a die coater, a knife coater, an applicator. The method of drying the coating film formed by applying the radio wave absorbing composition is not particularly limited, and examples thereof include a method using a known heating device such as an oven. The drying temperature and the drying time are not particularly limited. For example, the drying temperature can be in a range of 70° C. to 90° C., and the drying time can be in a range of 1 hour to 3 hours.

The radio wave absorber can be incorporated into various articles to which radio wave absorbability is desired to be imparted. For example, the plate-shaped radio wave absorber can be incorporated into an article in any form as it is or by being bent at any portion. In addition, it can be adjusted to a desired shape by injection molding or the like to be incorporated into an article.

A radio wave absorber having excellent radio wave absorption performance is useful for improving the recognition accuracy of radar. Examples of the indicator of the radio wave absorption performance include the transmission attenuation amount. In order to improve the recognition accuracy of the radar, it is desirable to increase the directivity of the radar. A high transmission attenuation amount can contribute to the improvement of the directivity of the radar. From the viewpoint of improving the directivity of the radar, the transmission attenuation amount of the radio wave absorber is preferably 8.0 dB or more, more preferably 8.5 dB or more, still more preferably 9.0 dB or more, and even still more preferably 10.0 dB or more. The transmission attenuation amount of the radio wave absorber can be, for example, 15.0 dB or less, 14.5 dB or less, 14.0 dB or less, 13.5 dB or less, 13.0 dB or less, 12.5 dB or less, or 12.0 dB or less. However, from the viewpoint of improving the directivity of the radar, it is preferable that the transmission attenuation amount of the radio wave absorber is high. Accordingly, the transmission attenuation amount of the radio wave absorber may exceed the values exemplified above.

Furthermore, in order to improve the recognition accuracy of the radar, it is desirable to enhance the selectivity of the radar by removing or reducing unnecessary radio wave components with the radio wave absorber, where the selectivity is receiving radio waves selectively from an object. A high reflection attenuation amount can contribute to the removal or reduction of unnecessary radio wave components. From this point, the reflection attenuation amount of the radio wave absorber is preferably 8.0 dB or more, more preferably 8.5 dB or more, still more preferably 9.0 dB or more, and even still more preferably 10.0 dB or more. The reflection attenuation amount of the radio wave absorber can be, for example, 18.0 dB or less, 17.5 dB or less, 17.0 dB or less, 16.5 dB or less, 16.0 dB or less, 15.5 dB or less, or 15.0 dB or less. However, from the viewpoint of removing or reducing unnecessary radio wave components, it is preferable that the reflection attenuation amount of the radio wave absorber is high. Accordingly, the reflection attenuation amount of the radio wave absorber may exceed the values exemplified above.

By the way, the on-vehicle radar, which has been attracting attention in recent years, is a radar that uses radio waves in the millimeter wave frequency band. The millimeter waves are electromagnetic waves having a frequency of 30 GHz to 300 GHz. The radio wave absorber preferably exhibits a transmission attenuation amount and a reflection attenuation amount in the above respective ranges with respect to a frequency of the radio wave, that is, one or more frequencies in the frequency band of 3 terahertz (THz) or less. From the viewpoint of usefulness for improving the recognition accuracy of the on-vehicle radar, the frequency at which the radio wave absorber exhibits a transmission attenuation amount and a reflection attenuation amount in the above range is preferably a millimeter wave frequency band, that is, one or more frequencies in the frequency band of 30 GHz to 300 GHz, more preferably one or more frequencies in the frequency band of 60 GHz to 90 GHz, and still more preferably one or more frequencies in the frequency band of 75 GHz to 85 GHz. As an example, the radio wave absorber can be a radio wave absorber having a transmission attenuation amount at a frequency of 76.5 GHz and a reflection attenuation amount at a frequency of 76.5 GHz in the above respective ranges. Such a radio wave absorber is suitable as a radio wave absorber that is incorporated on a front side (an incident side of the radio wave incident from the outside) of the radio wave transmitting and receiving unit in the on-vehicle radar in order to reduce the side lobe of the on-vehicle millimeter-wave radar.

In addition, from the viewpoint of usefulness for improving the recognition accuracy of the radio wave absorbing article that is used in the wireless technical field, such as a motion sensor, the frequency at which the radio wave absorber exhibits a transmission attenuation amount and a reflection attenuation amount in the above range is preferably a millimeter wave frequency band, that is, one or more frequencies in the frequency band of 30 GHz to 300 GHz, more preferably one or more frequencies in the frequency band of 50 GHz to 90 GHz, and still more preferably one or more frequencies in the frequency band of 55 GHz to 66 GHz. As an example, the radio wave absorber can be a radio wave absorber having a transmission attenuation amount at a frequency of 60.0 GHz and a reflection attenuation amount at a frequency of 60.0 GHz in the above respective ranges. Such a radio wave absorber is suitable as a radio wave absorber for improving recognition accuracy by removing unnecessary radio waves in wireless equipment such as an internal sensor of a cellular phone and a biological information sensor. Such a radio wave absorber can be suitably used, for example, in a radio wave absorbing article for a band of 55 to 66 GHz. The radio wave absorbing article is an article having radio wave absorbability to radio waves of one or more frequencies, and in a case where a radio wave absorber is incorporated into the article as at least a part thereof, the above radio wave absorbability can be obtained. The radio wave absorbing article for a band of 55 to 66 GHz is an article having radio wave absorbability to radio waves of one or more frequencies in a frequency band of 55 to 66 GHz. Examples of such an article include the above-described various wireless equipment. In a case where the radio wave absorber is incorporated into such a radio wave absorbing article, unnecessary radio waves can be removed, and thus the recognition accuracy can be improved.

The "transmission attenuation amount" in the present invention and the present specification is a value obtained by measuring an S parameter in a measurement environment at an ambient temperature of 15° C. to 35° C. with a free space method by setting an incidence angle of 0° and being determined as S21 of the S parameter. The "reflection attenuation amount" is a value determined as S11 of the S parameter by the same measurement. The measurement can be carried out using a known vector network analyzer and horn antenna. Examples of the specific example of the measurement method include the methods described in Examples described later.

EXAMPLES

Hereinafter, the present invention will be described based on Examples. However, the present invention is not limited to the embodiments shown in Examples. Unless otherwise specified, steps and evaluations described below were carried out in an environment of an ambient air atmosphere of an ambient temperature of 23° C.±1° C.

[Preparation and Evaluation of Magnetic Powders 1 to 12]

<Preparation of Magnetic Powder>

Strontium carbonate [$SrCO_3$], α-iron (III) oxide [$\alpha$-$Fe_2O_3$], and aluminum oxide [$Al_2O_3$] were mixed at such ratios that hexagonal ferrites having compositions in which the value of x in Formula 1 or the value of y in Formula 2 became the values shown in Table 1 were obtained, and the resultant mixtures were stirred using an EIRICH intensive mixer (model: EL1, manufactured by EIRICH) under the conditions described in Table 1 to obtain raw material mixtures.

For magnetic powders 1 to 7, next, the obtained raw material mixture was subjected to a pulverization treatment for 60 seconds by using Wonder Crusher WC-3, manufactured by OSAKA CHEMICAL Co., Ltd., as a cutter mill pulverizer, and setting the variable speed dial of this pulverizer to “3”, whereby pulverized materials were obtained. The obtained pulverized materials were placed in a muffle furnace, and the temperature inside the furnace was set to 1,100° C. in an ambient air atmosphere, followed by sintering for 4 hours, whereby magnetic powders 1 to 7 were obtained.

For the magnetic powders 8 to 12, magnetic powders were prepared in the same manner except that 5% by mass of strontium chloride hexahydrate [$SrCl_2 \cdot 6H_2O$] was further added to the raw material mixtures, and the temperature inside the furnace was changed to 1,200° C., whereby magnetic powders 8 to 12 were obtained.

<Checking of Crystal Structure>

The crystal structure of the magnetic material that constitutes each of the above magnetic powders was checked by X-ray diffraction analysis. As the measurement device, X'Pert Pro manufactured by PANalytical Co., Ltd., which is a powder X-ray diffractometer, was used. The measurement conditions are shown below.

—Measurement Conditions—

X-ray source: CuKα ray

[Wavelength: 1.54 Å (0.154 nm), output: 40 mA, 45 kV]

Scan range: 20 degrees<2θ<70 degrees

Scan interval: 0.05 degrees

Scan speed: 0.75 degrees/min

As a result of the X-ray diffraction analysis, it was confirmed that the magnetic powders 1 to 12 have a magnetoplumbite-type crystal structure and are a single-phase powder of a magnetoplumbite-type hexagonal ferrite that does not include a crystal structure other than the magnetoplumbite-type crystal structure.

<Checking of Composition>

The composition of the magnetic material that constitutes each of the above magnetic powders was checked by high frequency inductively coupled plasma emission spectroscopy. Specifically, the checking was carried out by the following method.

A container (a beaker) containing 12 mg of the magnetic powder and 10 mL of an aqueous solution of hydrochloric acid of a concentration of 4 mol/L was held on a hot plate at a set temperature of 120° C. for 3 hours to obtain a dissolution solution. 30 mL of pure water was added to the obtained dissolution solution, which is then filtered using a membrane filter having a filter pore diameter of 0.1 m. Elemental analysis of the filtrate obtained as described above was carried out using a high frequency inductively coupled plasma emission spectrometer [ICPS-8100, manufactured by Shimadzu Corporation]. Based on the obtained elemental analysis results, a content of each atom with respect to 100% by atom of iron atoms was obtained. Then, based on the obtained content, the composition of the magnetic material was checked. As a result, it was confirmed that the compositions of the magnetic powders 1 to 7 are compositions in which A in Formula 1 is Sr and x is the value shown in Table 1.

<Measurement of Saturation Magnetization σs>

As the measurement device, an oscillating sample magnetometer (model number: TM-TRVSM5050-SMSL) manufactured by TAMAKAWA Co., Ltd. was used in an environment of an ambient air atmosphere of an ambient temperature of 23° C. and under the conditions of a maximum applied magnetic field of 50 kOe, and a magnetic field sweep rate of 25 Oe/s, and each of the above-described magnetic powders was subjected to the measurement of the intensity of magnetization of the magnetic powder with respect to the applied magnetic field. From the measurement results, a magnetic field (H)—magnetization (M) curve of the magnetic powder was obtained. Based on the obtained magnetic field (H)—magnetization (M) curve, the saturation magnetization σs (unit: emu/g) was determined.

<Measurement of Half-Width β of Diffraction Peak on (107) Plane>

As the measurement device, X'Pert Pro manufactured by PANalytical Co., Ltd., which is a powder X-ray diffractometer, was used, and an X-ray diffraction spectrum was obtained for each of the above magnetic powders under the following measurement conditions. In the X-ray diffraction spectrum obtained for each of the magnetic powders, a diffraction peak on the (107) plane was confirmed as a peak having an apex at a position of about 32.5 degrees. For each of the magnetic powders, the half-width β of the diffraction peak on the (107) plane was determined by an analysis software (HighScore Plus, manufactured by PANalytical, Inc.) installed in the above-described powder X-ray diffractometer.

—Measurement Conditions—

X-ray source: CuKα ray

[Wavelength: 1.54 Å (0.154 nm), output: 40 mA, 45 kV]

Scan range: 25 degrees<2θ<35 degrees

Scan interval: 0.05 degrees

Scan speed: 0.33 degrees/min

<σs/β>

For each of the above magnetic powders, the ratio (σs/β) was calculated from the σs and the β determined by the above method.

Examples 1 to 11 and Comparative Examples 1 and 2

<Preparation of Radio Wave Absorber>

The magnetic powder shown in Table 1 was introduced into a kneader (Labo Plastomill manufactured by Toyo Seiki Seisaku-sho, Ltd.) together with a binder (an olefin-based thermoplastic elastomer (TPO) [MILASTOMER (registered trade name) 7030NS manufactured by Mitsui Chemicals, Inc.]) and kneaded for 20 minutes at a set temperature of 200° C. to obtain a composition for forming a radio wave absorber (an aggregated kneaded material), where the magnetic powder has such an amount that the volume filling rate of the magnetic powder in the radio wave absorbing composition was the value shown in Table 1.

The obtained composition for forming a radio wave absorber was press-molded using a heating press to obtain a radio wave absorber (a radio wave absorbing sheet) as a plate-shaped molded product having a square plane, one side of which had a length of 100 mm.

For each of the radio wave absorbers in Examples and Comparative Examples, the thickness was determined as the arithmetic mean of the measured values measured at nine points which were randomly selected, using a digital length measuring machine [Litematic (registered trade name) VL-50A manufactured by Mitutoyo Corporation]. All the thicknesses of the above radio wave absorbers were 2 mm.

<Transmission Attenuation Amount and Reflection Attenuation Amount>

The transmission attenuation amount (unit: dB) and the reflection attenuation amount (unit: dB) of each of the above radio wave absorbers were measured by the following method.

Examples 1 to 6 and Comparative Examples 1 and 2

As the measurement device, a vector network analyzer (product name: N5225B) manufactured according to Keysight Technologies and a horn antenna (product name: RH12S23) manufactured according to KEYCOM Corp. were used to measure an S parameter with a free space method by setting an incidence angle to 0° and a sweep frequency to 60 GHz to 90 GHz, with one plane of each of the above radio wave absorbers being directed toward the incident side, S21 of the S parameter at a frequency of 76.5 GHz was taken as the transmission attenuation amount, and S11 of the S parameter at a frequency of 76.5 GHz was taken as the reflection attenuation amount.

Examples 7 to 11

The S-parameters were measured in the same manner as above except that the sweep frequency was set to 55 GHz to 90 GHz, the S-parameter S21 at a frequency of 60.0 GHz was used as the transmission attenuation amount, and the S-parameter S11 at a frequency of 60.0 GHz was used as the reflection attenuation amount.

The above results are shown in Table 1.

From the results shown in Table 1, it can be confirmed that the radio wave absorbers of Examples 1 to 11 are radio wave absorbers that have both the high transmission attenuation amount and the high reflection attenuation amount and are capable of contributing to the improvement of recognition accuracy of various radio wave absorbing articles such as a radar or a motion sensor.

One aspect of the present invention is useful in the technical field of carrying out various automatic driving controls such as automatic driving control of an automobile, and the wireless technical field such as a motion sensor field.

What is claimed is:

1. A radio wave absorber comprising:

a magnetic powder; and a binder, wherein the magnetic powder is a powder of a hexagonal ferrite in which a ratio of a saturation magnetization σs to a half-width β of a diffraction peak on a (107) plane,

TABLE 1

| | | Example 1 | Example 2 | Example 3 | Example 4 | Example 5 | Example 6 | Example 7 |
|---|---|---|---|---|---|---|---|---|
| Magnetic powder | | Magnetic powder 1 | Magnetic powder 2 | Magnetic powder 3 | Magnetic powder 4 | Magnetic powder 5 | Magnetic powder 6 | Magnetic powder 8 |
| Stirring condition | Rotation speed | 2000 rpm | 1000 rpm | 1000 rpm | 2000 rpm | 1000 rpm | 500 rpm | 2000 rpm |
| | Stirring time | 60 min | 60 min | 30 min | 30 min | 15 min | 30 min | 60 min |
| Volume filling rate of magnetic powder [%] | | 30 | 30 | 30 | 30 | 30 | 30 | 30 |
| Transmission attenuation amount [dB] | | 13.3 | 12.5 | 12.3 | 12.2 | 9.6 | 8.3 | 12.5 |
| Reflection attenuation amount [dB] | | 11.5 | 11.5 | 11.4 | 11.2 | 11.6 | 11.2 | 11.2 |
| Composition | Value of x in Formula 1 | 1.95 | 1.94 | 1.96 | 1.93 | 1.93 | 1.96 | — |
| Composition | Value of y in Formula 2 | — | — | — | — | — | — | 1.10 |
| Half-width β | | 0.159 | 0.165 | 0.167 | 0.170 | 0.181 | 0.187 | 0.161 |
| σs [emu/g] | | 45.5 | 45.1 | 44.9 | 45.0 | 45.0 | 45.0 | 54.3 |
| σs/β [emu · g$^{-1}$ · degree$^{-1}$] | | 286 | 273 | 269 | 265 | 249 | 241 | 337 |

| | | Example 8 | Example 9 | Example 10 | Example 11 | Comparative Example 1 | Comparative Example 2 |
|---|---|---|---|---|---|---|---|
| Magnetic powder | | Magnetic powder 9 | Magnetic powder 10 | Magnetic powder 11 | Magnetic powder 12 | Magnetic powder 7 | Magnetic powder 7 |
| Stirring condition | Rotation speed | 2000 rpm | 2000 rpm | 2000 rpm | 2000 rpm | 1000 rpm | 1000 rpm |
| | Stirring time | 60 min | 60 min | 60 min | 60 min | 5 min | 5 min |
| Volume filling rate of magnetic powder [%] | | 30 | 30 | 30 | 30 | 30 | 45 |
| Transmission attenuation amount [dB] | | 9.0 | 9.1 | 8.1 | 8.0 | 6.7 | 10.3 |
| Reflection attenuation amount [dB] | | 9.1 | 9.5 | 8 | 8.1 | 11.4 | 6.5 |
| Composition | Value of x in Formula 1 | — | — | — | — | 1.94 | 1.96 |
| Composition | Value of y in Formula 2 | 0.80 | 1.20 | 0.50 | 1.44 | — | — |
| Half-width β | | 0.155 | 0.159 | 0.162 | 0.161 | 0.202 | 0.202 |
| σs [emu/g] | | 60.3 | 53.1 | 65.0 | 47.8 | 44.8 | 44.8 |
| σs/β [emu · g$^{-1}$ · degree$^{-1}$] | | 389 | 334 | 401 | 297 | 222 | 222 |

$\sigma s/\beta$, is 240 emu·g$^{-1}$·degree$^{-1}$ or more, where the half-width $\beta$ is determined by X-ray diffraction analysis, wherein the hexagonal ferrite is a substitution-type hexagonal ferrite, wherein the saturation magnetization $\sigma s$ is 65.0 emu/g or less and 42.0 emu/g or more, wherein the substitution-type hexagonal ferrite has a composition represented by Formula 1, $$A^1Fe_{(12-x)}Al_xO_{19} \quad \text{Formula 1:}$$

in Formula 1, $A^1$ represents one or more kinds of atoms selected from the group consisting of Sr, Ba, Ca, and Pb, and x satisfies $1.50 \le x \le 8.00$.

2. The radio wave absorber according to claim 1, wherein the substitution-type hexagonal ferrite is a substitution-type hexagonal strontium ferrite.

3. The radio wave absorber according to claim 1, wherein the ratio, $\sigma s/\beta$, is 240 emu·g$^{-1}$·degree$^{-1}$ or more and 310 emu·g$^{-1}$·degree$^{-1}$ or less.

4. The radio wave absorber according to claim 1, wherein the ratio, $\sigma s/\beta$, is 245 emu·g$^{-1}$·degree$^{-1}$ or more and 310 emu·g$^{-1}$·degree$^{-1}$ or less.

5. The radio wave absorber according to claim 1, wherein the $\beta$ is 0.190 degrees or less.

6. The radio wave absorber according to claim 1, wherein a volume filling rate of the magnetic powder is 35% by volume or less.

7. The radio wave absorber of claim 1, wherein x is less than 1.96.

8. A radio wave absorbing composition comprising:

a magnetic powder; and a binder, wherein the magnetic powder is a powder of a hexagonal ferrite in which a ratio of a saturation magnetization $\sigma s$ to a half-width $\beta$ of a diffraction peak on a (107) plane, $\sigma s/\beta$, is 240 emu·g$^{-1}$·degree$^{-1}$ or more, where the half-width $\beta$ is determined by X-ray diffraction analysis, wherein the hexagonal ferrite is a substitution-type hexagonal ferrite, wherein the saturation magnetization $\sigma s$ is 65.0 emu/g or less and 42.0 emu/g or more, wherein the substitution-type hexagonal ferrite has a constitution represented by Formula 1, $$A^1Fe_{(12-x)}Al_xO_{19} \quad \text{Formula 1:}$$

in Formula 1, $A^1$ represents one or more kinds of atoms selected from the group consisting of Sr, Ba, Ca, and Pb, and x satisfies $1.50 \le x \le 8.00$.

9. The radio wave absorbing composition according to claim 8, wherein the substitution-type hexagonal ferrite is a substitution-type hexagonal strontium ferrite.

10. The radio wave absorbing composition according to claim 8, wherein the ratio, $\sigma s/\beta$, is 240 emu·g$^{-1}$·degree$^{-1}$ or more and 310 emu·g$^{-1}$·degree$^{-1}$ or less.

11. The radio wave absorbing composition according to claim 8, wherein the ratio, $\sigma s/\beta$, is 245 emu·g$^{-1}$·degree$^{-1}$ or more and 310 emu·g$^{-1}$·degree$^{-1}$ or less.

12. The radio wave absorbing composition according to claim 8, wherein the $\beta$ is 0.190 degrees or less.

13. The radio wave absorbing composition according to claim 8, wherein a volume filling rate of the magnetic powder is 35% by volume or less.

* * * * *